United States Patent
Yang et al.

(10) Patent No.: US 9,994,468 B2
(45) Date of Patent: Jun. 12, 2018

(54) APPLICATION OF FERMENTATION BROTH OF POTAMOGETON CRISPUS IN THE REMOVAL OF NITROGEN IN CONSTRUCTED WETLANDS

(71) Applicant: NANJING UNIVERSITY, Nanjing (CN)

(72) Inventors: Liuyan Yang, Nanjing (CN); Qiankun Chen, Nanjing (CN); Yiying Jiao, Nanjing (CN); Quan Zhang, Nanjing (CN); Li Li, Nanjing (CN); Xu Chen, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 0 days. days.

(21) Appl. No.: 15/329,761

(22) PCT Filed: Dec. 18, 2014

(86) PCT No.: PCT/CN2014/094197
§ 371 (c)(1),
(2) Date: Jan. 27, 2017

(87) PCT Pub. No.: WO2016/019677
PCT Pub. Date: Feb. 11, 2016

(65) Prior Publication Data
US 2017/0210654 A1    Jul. 27, 2017

(30) Foreign Application Priority Data
Aug. 6, 2014 (CN) .......................... 2014 1 0384106

(51) Int. Cl.
*C02F 3/32* (2006.01)
*C02F 103/00* (2006.01)

(52) U.S. Cl.
CPC ........ *C02F 3/327* (2013.01); *C02F 2103/007* (2013.01)

(58) Field of Classification Search
CPC ............................ C02F 3/327; C02F 2103/007
USPC ............... 210/602, 606, 610, 612, 631, 903; 435/243, 259, 262, 262.5
See application file for complete search history.

(56) References Cited

U.S. PATENT DOCUMENTS

2009/0107912 A1* 4/2009 Pan .......................... C02F 1/288
210/602

OTHER PUBLICATIONS

Machine-generated English translation of CN 102174580, generated on Dec. 9, 2017.*

* cited by examiner

*Primary Examiner* — Fred Prince
(74) *Attorney, Agent, or Firm* — CBM Patent Consulting, LLC

(57) ABSTRACT

It discloses an application of a fermentation broth of *Potamogeton crispus* in the removal of nitrogen in constructed wetlands. The fermentation broth of *Potamogeton crispus* is prepared by the following method: collecting, draining off and grinding the *Potamogeton crispuses*, then, placing the grinded *Potamogeton crispuses* into a fermentation tank, mixing them with domesticated fermented sludge, and then adding water and fermenting the mixed liquor at a constant temperature, removing the residue of the *Potamogeton crispuses*, and obtaining the prepared fermentation broth of *Potamogeton crispus*. The present invention also discloses an application of the fermentation broth of *Potamogeton crispus* in the removal of nitrogen in constructed wetlands.

4 Claims, 3 Drawing Sheets

APPLICATION OF FERMENTATION BROTH OF POTAMOGETON CRISPUS IN THE REMOVAL OF NITROGEN IN CONSTRUCTED WETLANDS

This application is the U.S. national phase of International Application No. PCT/CN2014/094197 filed on 18 Dec. 2014 which designated the U.S. and claims priority to Chinese Application Nos. CN 201410384106.6 filed on 6 Aug. 2014, the entire contents of each of which are hereby incorporated by reference.

TECHNICAL FIELD

The present invention belongs to the field of environmental engineering, and particularly points to an application of the fermentation broth of *Potamogeton crispus* in the removal of nitrogen in constructed wetlands.

BACKGROUND

In recent years, the annual water quality assessment of Taihu Lake shows that 85.2% of the monitoring section water quality cannot meet Grade III requirements, most of them are Grade V and poor Grade V. The main exceeded pollutants are ammonia nitrogen, permanganate index, dissolved oxygen, biochemical oxygen demand after 5 days (BOD5), petroleum, total phosphorus and chemical oxygen demand. The water quality of the upper stream river inflowing into lake and the lake area continued to deteriorate, directly leading to an increase in the total amount of pollutants in the Taihu Lake. The contents of TP and TN in the Taihu Lake were increasing in recent years due to the increase of inflowing into lake pollutants. Therefore, the key to protect the water environment of Taihu Lake is to intercept the pollutants from the source inflowing into Taihu Lake, and control the total amount of pollutants discharged into the lake area from upper stream river.

At present, there are nearly 200 urban sewage treatment plants in the Taihu Lake, all of them are executing the Grade 1 (A) discharge standard in "Pollutant Discharge Standards for Urban Sewage Treatment Plants" (GB18918-2002). But the concentration of nitrogen and phosphorus in the Grade 1 (A) discharge standard (TN 15 mg/L, $NH_3$—N5 (8) mg/L, TP 0.5 mg/L) still far exceeds the surface water environmental quality standard (surface water Grade V water standard TN 2 mg/L, $NH_3$—N 2 mg/L, TP 0.4 (lake 0.2) mg/L). Facing the increasingly serious eutrophication of Taihu Lake, if tail water directly be discharged from sewage treatment plant without further treatment, it will have a big impact on the water quality of the rivers channel inflowing into the lake, then it will aggravate the pollution degree of nitrogen and phosphorus in Taihu Lake, threatening the safety of drinking water. At the same time, carrying out the further treatment and reuse of tail water is also a powerful measure to solve the problem of water shortage in Taihu Lake. It has significant environmental, economic and social benefits.

At present the commonly used water further treatment technologies are mainly physic-chemical method (filtration, adsorption, etc.), biological method (bioreactor, biofilter, constructed wetlands, etc.) and membrane separation method (reverse osmosis, microfiltration, nanofiltration, etc.). The constructed wetlands technology is widely used because of its low investment and maintenance cost, good effect of removing nitrogen and phosphorus, small secondary pollution and both scenery and view effects.

It was found that the nitrogen was highly nitrified and the carbon source was seriously insufficient in sewage treatment plant tail water. In addition, the carbon source of the water inlet was insufficient in nearly 50% of the urban sewage treatment plant in the Taihu Lake. However, the carbon source is the electron donor in the process of denitrification, which is the key factor for restricting the denitrification. To achieve the further treatment of the tail water of the sewage treatment plant, enough additional carbon source must be added to ensure a certain ratio of carbon and nitrogen, and then the denitrification process can be completed successfully.

The traditional denitrification carbon sources include glucose, methanol, ethanol and acetic acid, etc. But these carbon sources are expensive, and some of them, such as methanol, ethanol, acetic acid, etc have a certain toxicity and have a potential risk to the environment. In recent years, many researchers domestic and overseas try to find a new carbon source with low toxicity and cost to replace the traditional carbon source.

A large number of aquatic plants which are rich in cellulose matter are planted in constructed wetlands, and these plants can produce large amounts of volatile fatty acids (VFAs) and other nutrients by anaerobic fermentation, which are excellent potential additional carbon source of denitrification.

Taking the aquatic plants planted in constructed wetlands as raw materials, the cellulose matter in the plants is converted into volatile fatty acids (VFAs) and other nutrient elements by anaerobic fermentation, used to be the carbon source of denitrification. Results showed that further nitrogen removal of sewage treatment plant tail water is achieved, and the resource utilization of aquatic plants is realized at the same time.

The previous research results showed that the nitrification and denitrification of microorganisms are important ways of nitrogen cycling in nature. Denitrification is the process that under anaerobic or hypoxic conditions microorganism converts the nitrate nitrogen and nitrite nitrogen into nitrogen and release it into the atmosphere. The main influencing factors of nitrogen removal are dissolved oxygen (DO), pH, temperature, carbon source, etc.

(1) Dissolved Oxygen (DO): in order to ensure normal denitrification, dissolved oxygen must be kept at 0.5 mg/L or below. This is because the ability of $O_2$ to accept electrons is stronger than that of $NO_2^-$—N and $NO_3^-$—N. When both molecular oxygen and nitrate are existed, denitrifying bacteria preferentially carry out aerobic respiration.

(2) pH: the optimal pH of denitrification is 7-8.

(3) Temperature: the optimal temperature of denitrification is 15~30◻. Denitrifying bacteria are more sensitive to temperature reduction than nitrifying bacteria. When seasonal cooling occurs, the denitrification process will be inhibited before the nitrification process, at this time additional carbon source is needed in order to improve the denitrification effect. In addition, the temperature has a significant impact on the mircrobial activity, and then affecting the effect of denitrification.

(4) Carbon source: carbon source is the electron donor in the denitrification process, and it is also the main source of energy for microbial growth and reproduction. The lack of carbon source will directly affect the denitrification. Adding additional carbon source is one of the effective methods to improve denitrification nitrogen removal efficiency. The species and the amount of the additional carbon source will have a significant impact on denitrification efficiency.

Existing additional carbon sources can be broadly divided into two categories, the traditional carbon sources and the new carbon sources. Traditional carbon sources are mainly liquid state organic matter, including low-molecular organic matter (such as methanol, ethanol and acetic acid, etc.) and carbohydrate matter (such as glucose, sucrose, etc.). The new carbon sources mainly include natural solid organic matter rich in cellulose matter (such as plant stalks, etc.), some degradable artificial materials (such as waste paper, degradable lunch boxes, etc.) and high carbon content of industrial waste water.

Methanol, ethanol, acetic acid and other low molecular organic matter are easily used by denitrification bacteria, and these materials are considered as ideal additional carbon source. Gersberg et al. (1983) achieved a 95% nitrogen removal efficiency by adding methanol to the constructed wetlands system. The research results of Pochana et al. (1999) showed that the addition of acetic acid as carbon source can greatly improve the progress of simultaneous nitrification and denitrification. Rustige et al. (2007) added acetic acid as the carbon source to treat the landfill leachate in the horizontal stream section of the composite flow constructed wetlands, the results showed that the denitrification rate increased with the increasing of acetic acid concentration, and the nitrate removal rate was up to 98%. The denitrification efficiency of this species carbon source is high, but the cost is expensive and methanol has a certain toxicity and its transportation is inconvenient.

Carbohydrate matter as an additional carbon source of denitrification, the cost is lower. Zhao Lianfang et al. (2006) treated urban polluted river by constructed wetlands, the results showed that the addition of glucose could effectively improve the removal efficiency of nitrogen, when the wetlands C/N was increased from 2 to 8, TN removal rate was increased from 55% to 89%. She Lihua et al. (2009) added carbon source through specific breather pipe of the composite integrated vertical flow constructed wetlands (IVCW) system to the bottom of wetlands in order to strengthen wetlands denitrification effect. The results showed that glucose was better than carboxymethyl cellulose (CMC) as the additional carbon source, and the optical dosage of glucose was 1.5 g for integrated vertical flow constructed wetlands (IVCW) system with 60 L/d treatment capacity. Under this circumstance, the mass ratio of glucose to nitrate nitrogen was only 4.3, much lower than the ratio that denitrification required. However, when glucose was used as the carbon source, the productivity rate of microbial cells was high, which may lead to clogging of artificial wetlands and other process.

Liu Gang et al. (2010) believed that denitrification efficiency was restricted by the low-molecular organic matter content in industrial waste water when industrial waste water was used as an additional carbon source, if the low-molecular organic matter content was low, denitrification efficiency would not be significantly improved. At the same time, the dosage of industrial waste water must be controlled to prevent water quality deterioration of water outlet.

Cellulose carbon sources come from a wide range and the cost is low. At present many scholars have studied the potential implications of waste paper, corn stalks, wheat straw, straw and cattail, reed and other aquatic plant branches or stalks as carbon sources. Wenhui et al. (2011) studied the effect of wheat straw as an additional carbon source on the removal of nitrogen in constructed wetlands. The results showed that when the concentration of water inlet nitrate nitrogen was 30 mg/L, the optimal conditions for removal of nitrate nitrogen were 25▯, the reaction time was 10 h, the mass ratio of straw to water was 1:50. Scanning electron microscopy showed that the surface of the reacted wheat straw appeared hollow, from the dense striated structure into a broken filamentous structure, indicating that the biodegradable components of wheat straw surface were largely decomposed by microbes as denitrifying carbon source. Jin Zanfang et al. (2004) studied the nitrogen removal effect of cotton and paper as carbon sources. The results showed that both carbon sources could make the reactor start quickly. At room temperature 25▯, the water inlet nitrate nitrogen were 22.6 and 45.2 mg/L and hydraulic retention time were 9.8 and 8.6 h respectively, the removal rates of nitrate nitrogen were 100% and 99.6%, respectively, and no nitrite accumulation in water outlet. Chen Yunfeng et al. (2010) compared the nitrogen removal effect of wheat straw, peanut shells, sweet potato stem, corn cob, Canna litter, degradable meal boxes, polybutylene succinate (PBS) and polyhydroxyalkanoates (PHAs) as carbon sources, and the results showed that wheat straw was more suitable as the additional carbon source of denitrification for the sewage treatment plants tail water. Zhao Lianfang et al. (2009) determined that the reed rods was the more suitable plant carbon source compared to corn stover, rice husk, sawdust, according to their organic matter release ability and the potential effect on water quality. When the addition amount was 1.0 kg/m², the removal rate of TN in integrated vertical flow constructed wetlands increased from 60% to 80%. The application of cellulose matter on carbon source of denitrification could not only improve the removal efficiency of nitrogen, but also achieve the purpose of waste utilization. But its shortcoming is that the release of carbon source cannot be effectively controlled, the required hydraulic retention time is long, and the water outlet quality is susceptible to external temperature.

The urban organic waste water (such as vintage waste water, molasses waste water, starch waste water, etc.) and excess sludge in urban sewage plant contains a large number of easily biodegradable matter. After anaerobic fermentation, it can produce large amounts of short chain volatile fatty acids, such as acetic acid, propionic acid, which can be used by denitrifying microorganisms. Table 1 summarizes the nitrogen removal effects of fermentation broth of several urban organic wastes as denitrification additional carbon source.

TABLE 1

Research Status of the Fermentation Broth of Abandoned Biomass as Denitrification Carbon Source

| Matrix | Acid-producing quantity/mgCOD · L−1 | Production composition/% | | | VFA/SCOD | Denitrification efficiency/ mgNO$_3^-$—N · (gVSS · h)−1 |
| --- | --- | --- | --- | --- | --- | --- |
| | | Acetiv acid | Propionic acid | Butyric acid | | |
| Excess sludge fermentation | 92~370 | — | — | — | 0.1~0.2 | 2.4 |
| Primary sludge fermentation | 3500~8700 | 41 | 36 | 18 | 0.69~0.94 | 2.34 |
| Hydrolysis of molasses | 100~200 | | | | | 2.9~3.6 |

TABLE 1-continued

Research Status of the Fermentation Broth of Abandoned Biomass as Denitrification Carbon Source

| Matrix | Acid-producing quantity/mgCOD · L-1 | Production composition/% | | | VFA/SCOD | Denitrification efficiency/ mgNO$_3^-$—N · (gVSS · h)-1 |
| --- | --- | --- | --- | --- | --- | --- |
| | | Acetiv acid | Propionic acid | Butyric acid | | |
| Hydrolysis of starch waste water | 1165 | 54 | 23 | 31 | 0.72 | 0.9 |
| Hydrolysis of primary sludge | — | — | — | — | — | 41 |
| Food waste water fermentation matter | 9500 | 25 | 14 | 18 | 0.33 | 8.2 |

At present, most of the domestic and foreign scholars studied the nitrogen removal effect by using the anaerobic fermentation acidification products of the excess sludge in urban sewage treatment plant as the additional carbon source. The excess sludge is used as the fermentation substrate, which reduced the amount of sludge and the cost of sludge treatment, and provided high quality carbon source for nitrogen and phosphorus removal in sewage. Tong Juan (2008) used the fermentation broth of the excess sludge obtained under the alkaline condition as the additional carbon source to treat the low COD (Chemical Oxygen Demand) domestic wastewater, and used the actual sewage as the carbon source for comparative study. The results showed that in the SBR system added fermentation broth, the nitrogen and phosphorus removal rates improved a lot, and the removal of COD (Chemical Oxygen Demand), TN and SOP were 93%, 80.9% and 97.2%, respectively. When adding the actual sewage as carbon source, the removal rates of COD, TN and SOP were 85%, 63.5% and 43.9% respectively. Liu Daoguang used surfactant to promote acid production process, and then use the fermentation broth as the carbon source of nitrogen and phosphorus removal system. Results showed that the removal rates of TP, NH$_3$—N and TN reached 97%, 95% and 81%, respectively and the VFAs in the fermentation broth was used in the sequences of butyric acid, propionic acid, acetic acid.

*Potamogeton crispuses* have strong vital force, wide adaptability, and thus a lot of cultivation in the constructed wetlands. *Potamogeton crispuses* is rich in cellulose matter. After harvest, *Potamogeton crispus* may produce a large amount of volatile fatty acids (VFAs) and other nutrients by anaerobic fermentation. It is an excellent potential additional carbon source and can be used as a carbon source supplement for denitrification. The further denitrification treatment of the subsurface flow type constructed wetlands with the sewage plant tail water can be realized, and the resource utilization of the aquatic plants can be realized.

SUMMARY

The technical problem to be solved by the present invention is to provide an application of fermentation broth of *Potamogeton crispus* added into the constructed wetlands as the carbon source of denitrification.

In order to solve the above-mentioned technical problem, the present invention uses the following technical solutions:

An application of fermentation broth of *Potamogeton crispus* in the removal of nitrogen in constructed wetlands.

Wherein, the fermentation broth of *Potamogeton crispus* is prepared by the following method:

(1) Preparation of *Potamogeton crispuses*: collecting, draining off and grinding the *Potamogeton crispuses*;

(2) Preparation of the fermentation broth: placing the *Potamogeton crispuses* into a fermentation tank, mixing it with domesticated fermented sludge, and then adding water and fermenting the mixture at a constant temperature, removing the residue of *Potamogeton crispuses*, thereby the fermentation broth of *Potamogeton crispus* is prepared.

Wherein, in the step (2), *Potamogeton crispuses*, activated sludge and water are placed at a ratio of 100 kg:1 L:1 L.

In the step (2), the domestication method of activated sludge is cultivated and domesticated by the well-known methods in the art, and the nitration microorganism finally turn to be dominant bacterial community by controlling the composition of the domesticated medium and the temperature, pH and time; preferably, using the following method:

The compositions of the domesticated medium are as follows: glucose 15 g/L, NaNO$_3$3.04 g/L, KH$_2$PO$_4$0.44 g/L, MgSO$_4$.7H$_2$O0.96 g/L, CaCl$_2$0.72 g/L, NaHCO$_3$0.96 g/L, MnCl$_2$0.11 g/L.

Filling 2.5 kg excess sludge of sewage treatment plant after dehydration into the 5 L fermentation tank, adding 4 L domesticated medium, adjusting the pH to 7.4, 28° C. domestication one week, monitoring the pH every day.

Wherein, in the step (2), the fermentation temperature is 12-30° C. preferable is 20-30° C. the best is 30° C.

Wherein, the fermentation time is 5-10 day, preferable is 7 day.

Wherein, during the fermentation process, pH is controlled at 7~8, preferable is 7~7.5.

Wherein, waste water is sewage treatment plant tail water, of which nitrogen content is 10-15 mg/L, preferable is 12 mg/L.

Wherein, adding the fermentation broth of *Potamogeton crispus* into the tail water of the sewage treatment plant according to the following adding amount: the ratio of COD value of fermentation broth of *Potamogeton crispus* to the N content of tail water is 8-16, preferable is 9-10; the hydraulic retention time of tail water is 4-8 h, preferable is 6 h.

Beneficial Effects:

The present invention has the following significant features and effects:

1. The raw material of *Potamogeton crispuses* is low cost and widely grown in environment, and the preparation method of fermentation broth of *Potamogeton crispus* is simple and easy.

2. The resource utilization of *Potamogeton crispuses* solved the problem that it is difficult to dispose harvested disposed *Potamogeton crispuses*, and alleviated its harm to the environment.

3. It was found that the nitrogen removal efficiency of the subsurface flow style constructed wetland could be improved quickly and effectively by adding the fermentation broth of *Potamogeton crispuses* as the carbon source to the constructed wetlands, and the nitrogen and phosphorus in the fermentation broth is removed mostly.

DETAILED DESCRIPTION

The present invention will be better understood with the following examples. However, it will easier to understand by those skilled in the field. The description is for the purpose of illustrating the invention and should not limit the invention as detailed in the claims.

Figure 1:
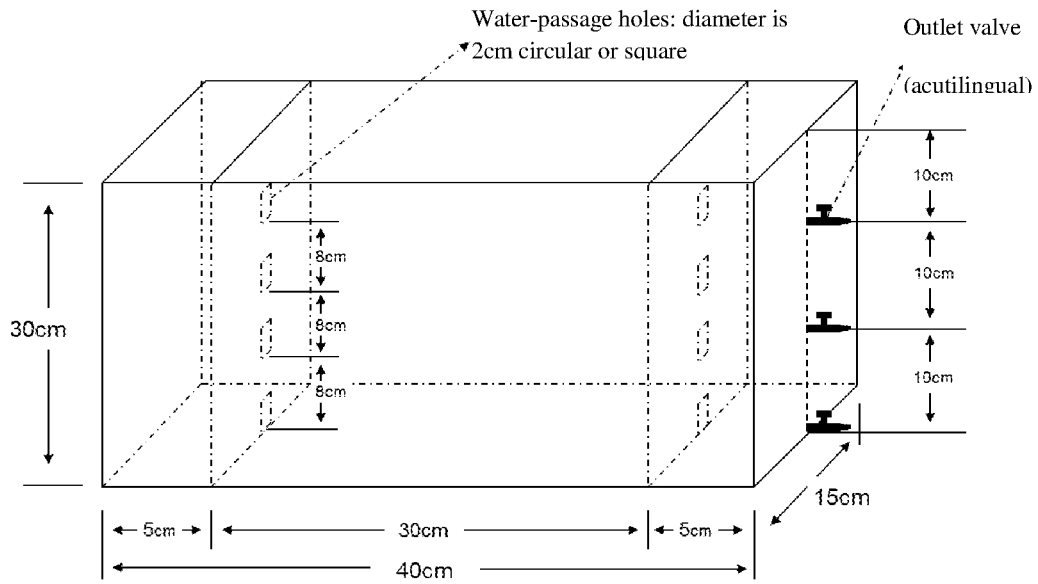
FIG. 1 horizontal subsurface flow constructed wetlands.

The structure of the experimental device used in the examples is shown in FIG. 1. The experimental device is a horizontal subsurface flow type constructed wetlands, made of PVC perspex sheet with inner diameter of L×W×H=40 cm×15 cm×30 cm, divided into 3 parts which are water distribution zone, treatment zone and catchment zone. The length of water distribution zone is 5 cm, and the width is 15 cm. It is separated from the treatment zone by the perforated plate. The perforated plate is evenly distributed from the bottom to the top with 4 diameter of 2 cm circular water-passage holes, laying 3 cm grain size gravel in the inside of the zone, preliminary filtering of the inlet water to prevent the blockage of wetlands inside. The length of treatment zone is 30 cm, and the width is 15 cm. The treatment zone is filled 25 cm thick soil mixed with vermiculite (the mixture mass ratio of vermiculite and soil is 1:1, vermiculite grain size is 1 cm), and 6 strains of calamus are planted inside, which are collected from Nanjing University Xianlin campus Teana River. The height of plants is about 50~60 cm, and the growth condition is well. The length of catchment zone is 5 cm, and the width is 15 cm, which is separated from the treatment zone by a perforated plate, laying 3 cm grain size gravel in the inside of the zone. Three outlet valves are setting at the 0 cm, 10 cm, 25 cm height to adjust the water level, respectively.

The instruments used in the examples are: Baoding Lange BT-2 type constant current pump, XX type magnetic stirrer, 1.5 L suction filter bottle, 1.25 L Wahaha pure water bottle, plant crusher, water jacked thermostatic incubator, UV-Visible Spectrophotometer UV2450, D-1 Automatic Steam Sterilizer, Electronic Scales, 25 mL glass-ground colorimetric tube with a plug, Quartz Cuvette, Ultrapure water system (Milli-Q, Millipore), 0.45 μm water-based filter membrane.

Detection methods of water examples are as follows: (1) using peroxide potassium sulfate-ultraviolet spectrophotometry to measure TN; (2) using ultraviolet spectrophotometry to measure $NO_3^-$—N; (3) using N-(1-naphthyl)-ethylenediamine spectrophotometry to measure $NO_3^-$—N; (4) using Nessler's reagent spectrophotometry to measure $NH_3$—N; (5) using Potassium persulfate digestion-ammonium molybdate coloration method to measure TP: using potassium dichromate method to measure $COD_{Cr}$; (6) using Hash HQ30d portable dissolved oxygen instrument to measure DO; (7) using Hash HQ30d portable pH meter to measure pH.

Before the formal testing, the constructed wetlands system need some time to run. The system was started on 2013 the middle of August. In the first three days, adding a certain amount of activated sludge was added which was domesticated by denitrification medium to carry out microorganism inoculation, $NaNO_3$ was used as nitrogen source for influent water, and glucose as carbon source. The concentration of nitrate nitrogen in water inlet was 15 mg/L, and the C/N was 8. The outlet water quality was stable after running for a month, and all the four wetland devices were in stable operation status, and the nitrogen removal efficiency under the same condition had no significant difference.

Water inlet was suctioned from the reservoir into constructed wetlands water distribution zone by using a constant flow pump at a constant rate, and the treated water from the outlet valve of the top catchment zone flowed into the catchment pool. Using $NaNO_3$ as nitrogen source, the concentration of $NO_3$—N in inlet was 12 mg/L, and the fermentation broth of *Potamogeton crispus* was the carbon source. The ratio of COD to nitrogen in water inlet were 0, 8, 16 and 24 by changing the adding amount of the fermentation broth of *Potamogeton crispus*, and hydraulic retention time were 2, 4 and 8 h. Continuing water inlet and water outlet for 2 d under each hydraulic retention time, water samples were taken at 8 h intervals, determination of total nitrogen, nitrate nitrogen, ammonia nitrogen, nitrite nitrogen, total phosphorus, $COD_{Cr}$, pH and DO. The experiment was repeated three times.

Example 1: The Preparation of a Fermented Sludge

The fermentation sludge used in the experiment was obtained from the excess sludge after dewatering in sewage treatment plant.

The composition of the acclimation medium was as follows: glucose 15 g/L, $NaNO_3$ 3.04 g/L, $KH_2PO_4$ 0.44 g/L, $MgSO_4.7H_2O$ 0.96 g/L, $CaCl_2$ 0.72 g/L, $NaHCO_3$ 0.96 g/L, $MnCl_2$ 0.11 g/L. Filling 2.5 kg excess sludge of sewage treatment plant after dehydration into the 5 L fermentation tank, adding 4 L domesticated medium, adjusting the pH to 7.4, 28° C. domestication one week, monitoring the pH every day.

The fermentation sludge in the following examples was prepared according to the above-mentioned method.

Example 2: The Preparation of Fermentation Broth of *Potamogeton crispus*

*Potamogeton crispuses* used in the experiment were collected from the Tianlai River in Xianlin campus of Nanjing University. Collecting and draining off the *Potamogeton crispuses*, taking 1.3 kg, grinding by using a plant crusher, placing into a volume of 5 L fermentation tank, adding the domesticated fermentation sludge 350 ml, and 3000 ml of tap water at the same time, adjusting the pH to 7-8. Fermentation tank was placed in a water-jacked thermostatic incubator, anaerobic fermentation at 30° C. for 7 days, filtrating the fermentation broth to remove the *Potamogeton crispuses* residue, collecting filtrate, preserved and reserve at 4° C.

The fermentation broth of *Potamogeton crispus* in the following examples was prepared according to the above-mentioned method.

Example 3: Effect of Adding Fermentation Broth of Potamogeton Crispus on Nitrogen Removal Effect in Constructed Wetlands The effects of different ratio of COD to nitrogen in water inlet and different HRT on the water quality of water outlet were shown in Table 2, with the fermentation broth of Potamogeton crispus as the additional carbon source for horizontal subsurface flow style constructed wetlands.

Figure 2:
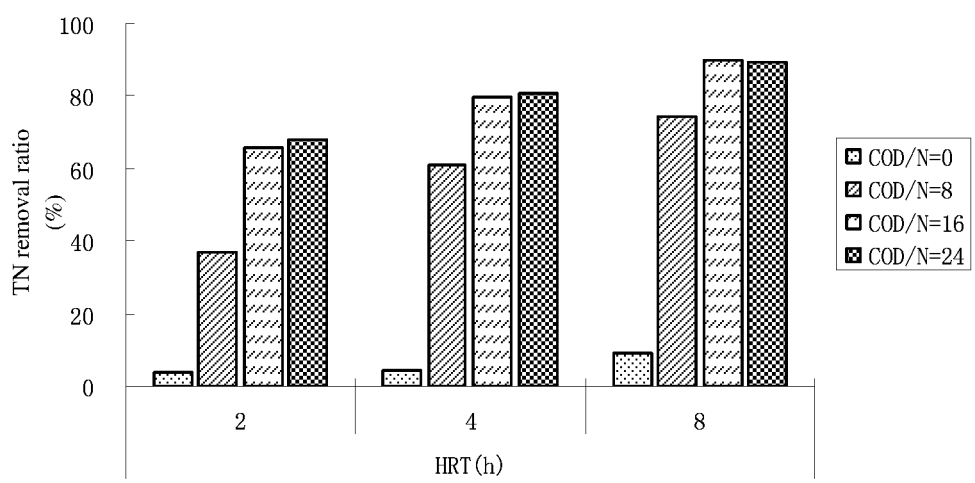
FIG. 2 removal rate of TN in subsurface flow type constructed wetlands.

It can be seen from FIG. 1 and FIG. 2 that under the three kinds of hydraulic retention time. The removal rate of TN and $NO_3^-$—N were all enhanced with the increasing of ratio of COD to nitrogen in water inlet. when the ratio of COD and nitrogen in water inlet was 0, under 3 different hydraulic retention time the removal rates of TN and $NO_3^-$—N were 4%~9% and 4%~14% respectively, which indicated that denitrification nitrogen removal efficiency was very low; when the ratio of COD and nitrogen in water inlet was 8, the removal rates of TN and $NO_3^-$—N increased to 37%~74% and 68%~87%, respectively. Compared to no Potamogeton crispus fermentation broth added condition, the removal efficiency of nitrogen was significantly improved (p=0.001); when the ratio of COD and nitrogen in water inlet was 16 and 20, the removal rate of TN and $NO_3^-$—N reached 66%~90%, 84%~100% respectively, which indicated that the denitrification occurred in system strongly. The concentration of $NO_3$—N in water outlet (HRT=4, 8 h) was below the limit of detection, and the $NO_2^-$—N in water outlet is no accumulation, indicating that the addition of fermentation broth of Potamogeton crispus was enough for denitrifying microorganisms to achieve complete denitrification.

Under the same ratio of COD to nitrogen and different hydraulic retention time, the removal rates of TN and $NO_3^-$—N were compared, and it was found that the removal rates of TN and $NO_3^-$—N were increased with the extension of hydraulic retention time. When the ratio of COD and nitrogen was 16 and HRT were =2, 4, 8 h, the removal rate of TN was 66%, 80%, 90% respectively, and the removal rates of $NO_3^-$—N were 84%, 100%, 100%. It was revealed that the hydraulic retention time had a significant effect on the removal efficiency of nitrogen in water outlet when the carbon source was sufficient. Appropriate extension of hydraulic retention time would help denitrifying microorganisms remove more nitrogen.

It can be seen from Table 2 that ratio of COD and nitrogen in water inlet and hydraulic retention time all have a significant effect on $NO_2^-$—N content in water outlet. When the ratio of COD and nitrogen was 8 and HRT were =2, 4, 8 h, the concentration of $NO_2^-$—N in water outlet was 4.1, 2.1, 0.35 mg/L respectively. Compared with the concentration of $NO_2^-$—N in water inlet, the outlet cumulated 205, 105, 17.5 times of $NO_2^-$—N, respectively. This was because that the carbon source was insufficient and the denitrification process staid at the stage of $NO_3^-$—N transforming into $NO_2^-$—N, leading to the continuous accumulation of $NO_2^-$—N in the system. After increasing the ratio of COD and nitrogen in water inlet into 16, the $NO_2^-$—N content in water outlet decreased significantly and the degree of accumulation decreased greatly. It is also found that $NO_2^-$—N concentration in water outlet decreased with the extension of hydraulic retention time. When the ratio of COD and nitrogen was 8 and HRT were =2, 4, 8 h, the concentration of $NO_2N$ in water outlet concentration was 1.3, 0.08, 0.02 mg/L respectively. The results showed that the process of $NO_2^-$—N transforming into $N_2$ occurred at 2~4 h when the carbon source was sufficient.

Example 4: Effect of the Fermentation Broth of Potamogeton Crispus on the Concentration of $NH_3^-$—N and TP in Water Outlet Adding the fermentation broth of Potamogeton crisous as the additional carbon resource of the horizontal subsurface flow type, the concentration of $NH_3$—N and TP in water outlet are shown in the Table 2.

TABLE 2

Water Quality of Constructed Wetlands Water Outlet

| HRT (h) | Water inlet COD/N | TN (mg/L) | $NO_3^-$—N (mg/L) | $NO_2^-$—N (mg/L) | $NH_3$—N (mg/L) | TP (mg/L) | $COD_{Cr}$ (mg/L) | $COD_{consumption}/N$ |
|---|---|---|---|---|---|---|---|---|
| 2 | 0 | 14.55 | 13.7 | 0.02 | 0.17 | 0.11 | 8 | 1.1 |
|   | 8 | 10.37 | 4.5 | 4.1 | 1.3 | 0.56 | 56 | 3.9 |
|   | 16 | 6.1 | 2.3 | 1.3 | 2.3 | 0.87 | 120 | 7.0 |
|   | 20 | 6.2 | 2.1 | 1.6 | 3.6 | 0.98 | 212 | 8.6 |
| 4 | 0 | 14.45 | 13.5 | 0.02 | 0.12 | 0.08 | 8 | 1.1 |
|   | 8 | 6.4 | 2.5 | 2.1 | 0.94 | 0.21 | 34 | 5.5 |
|   | 16 | 3.65 | 0 | 0.08 | 1.8 | 0.48 | 83 | 9.6 |
|   | 20 | 3.71 | 0 | 0.08 | 2.3 | 0.55 | 188 | 10.3 |
| 8 | 0 | 13.7 | 12.2 | 0.01 | 0.08 | 0.07 | 6 | 1.3 |
|   | 8 | 4.2 | 1.9 | 0.35 | 0.73 | 0.17 | 32 | 5.6 |
|   | 16 | 1.8 | 0 | 0.02 | 1.3 | 0.33 | 57 | 11.5 |
|   | 20 | 2.1 | 0 | 0.02 | 1.5 | 0.42 | 198 | 9.6 |

Figure 3:
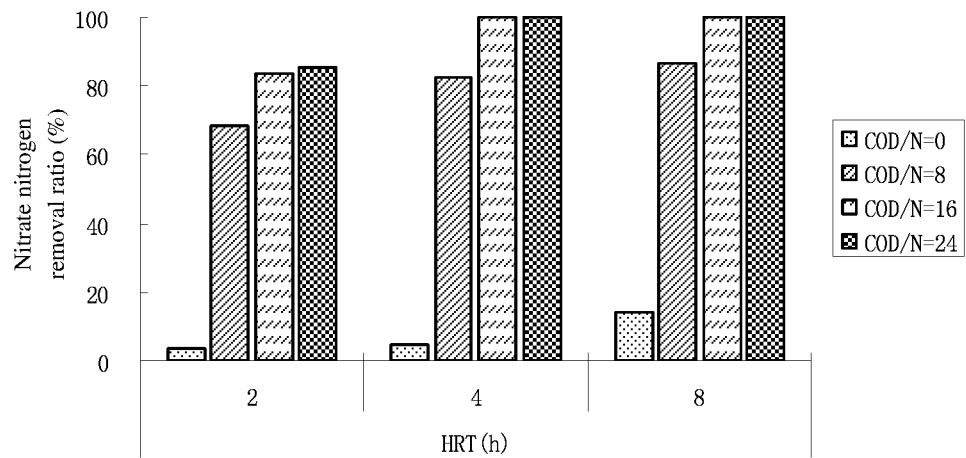
FIG. 3 removal rate of $NO_3^-$—N in subsurface flow type constructed wetlands.
Figure 4:
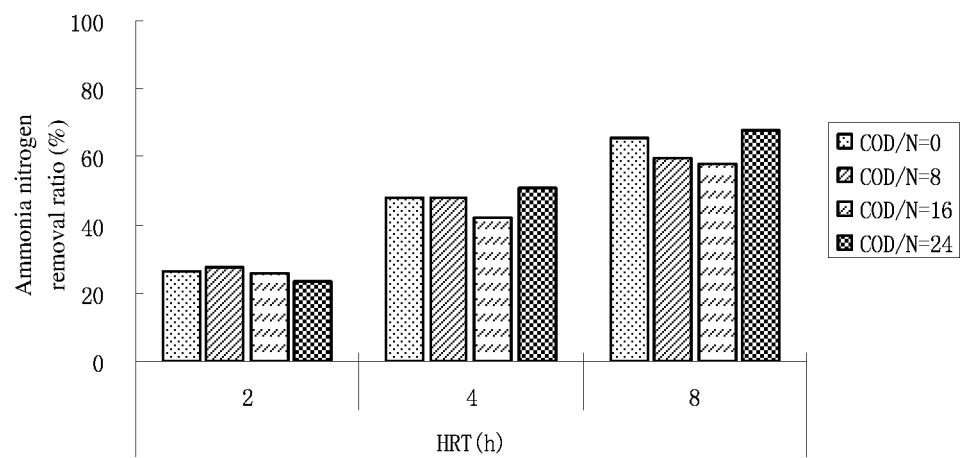
FIG. 4 removal rate of $NO_3$—N in subsurface flow type constructed wetlands.
Figure 5:
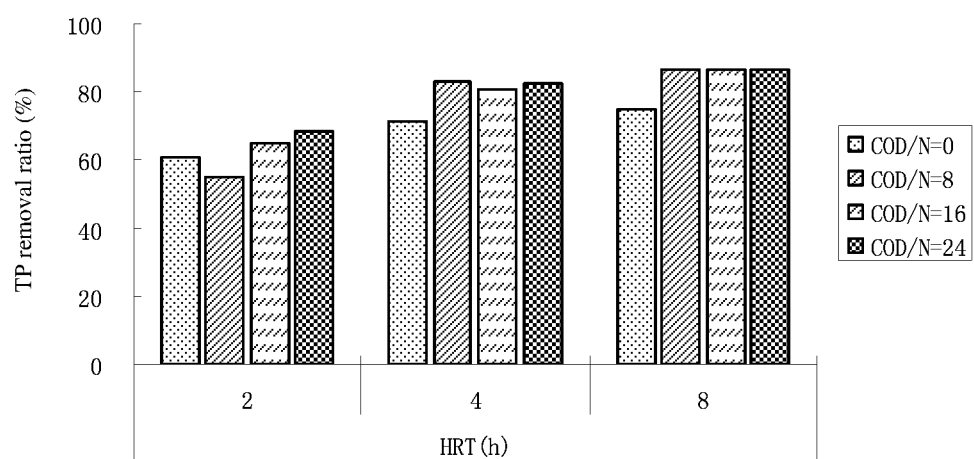
FIG. 5 removal rate of TP in subsurface flow type constructed wetlands.

FIG. 3 and FIG. 4 respectively show the removal efficiency of $NH_3$—N and $NH_3$—N in horizontal subsurface flow constructed wetlands system. The concentration of $NH_3$—N and TP in water outlet all enhanced with the increasing of water inlet COD to nitrogen. This is mainly because that the higher the ratio of COD to nitrogen in the water, the more nitrogen (mainly ammonia nitrogen) and phosphorus were introduced in by adding Potamogeton crispuses. There is no obvious correlation between at the removal rate of $NH_3$—N, TP and the ratio of COD and nitrogen in water inlet, but the removal rate of $NH_3$—N, TP increase with the extension of hydraulic retention time. The existing studies have shown the three main ways to remove $NH_3$—N in the constructed wetlands system: (1) Ammonia nitrogen in the surface of the wetlands enters into the atmosphere by volatilization. (2) Ammonia oxidizing bacteria and ammonia oxidizing archaea transformed ammonia nitrogen into nitrate nitrogen, and then turned to $N_2$ through denitrification. (3) Plant absorption and matrix adsorption. The removal of phosphorus in the constructed wetlands system depends mainly on soil adsorption. Appropriate extension of hydraulic retention time can make ammonia oxidizing bacteria and ammonia oxidizing archaea have more time to transform into ammonia nitrogen, at the same time it is favor of the soil adsorption of ammonia nitrogen, phosphorus. When the ratio of COD and nitrogen was 16 in water inlet, HRT was 4 h. The concentration of TP in constructed wetlands system was 0.48 mg/L, which is close to the standard of surface water Grade V.

When the HRT was 4 h, as long as carbon source is sufficient in water inlet, the denitrifying microorganism in the constructed wetlands system can completely remove the $NO_3$—N in the water inlet. At the same time the ratio of $COD_{consumption}$ and nitrogen was 9.6 is the most optimum ratio of COD and nitrogen in water inlet for water treatment. And under this circumstance the best ratio of COD and nitrogen was 9.6, the ammonia nitrogen and TP content in water outlet can completely reach the standard of surface water Grade V. In addition, the introduced nitrogen and phosphorus by adding fermentation broth can be removed by the system itself, and there in no influence on the water quality of water outlet.

What is claimed is:

1. A process for utilizing a fermentation broth of *Potamogeton crispus* in the removal of nitrogen in constructed wetlands, characterized in that the fermentation broth of *Potamogeton crispus* is prepared by the following method:

(1) preparation of the *Potamogeton crispus*: collecting, draining off and grinding the *Potamogeton* crispuses;

(2) preparation of the fermentation broth: placing the grinded *Potamogeton* crispuses into a fermentation tank, mixing them with domesticated fermented sludge as a mixed liquor, and then adding water and fermenting the mixed liquor at a constant temperature, removing residue of *Potamogeton crispuses*, and obtaining the prepared fermentation broth of *Potamogeton crispus*;

wherein the *Potamogeton crispuses*:the fermented sludge:water are mixed at a ratio of 100 kg:1 L:1 L in the step (2);

nitrogen content is 10-15 mg/L in tail water of a sewage treatment plant;

the fermentation broth of *Potamogeton crispus* is added into the tail water of the sewage treatment plant by the ratio of the Chemical Oxygen Demand (COD) value of the fermentation broth of *Potamogeton crispus* to the nitrogen content of the tail water is between 8:1 to 16:1; the hydraulic retention time of the tail water is between 4 and 8 hours.

2. The process according to claim 1, characterized in that the fermentation temperature is 12-30° C. in the step (2).

3. The process according to claim 1, characterized in that the fermentation time is 5-10 day in the step (2).

4. The process according to claim 1, characterized in that the pH is controlled at 7-8 during the fermentation process in the step (2).

* * * * *